US012724378B2

(12) United States Patent
Suzuki et al.

(10) Patent No.: US 12,724,378 B2
(45) Date of Patent: Sep. 1, 2026

(54) CLEANING BLADE AND METHOD OF PRODUCING ELASTIC MEMBER OF CLEANING BLADE

(71) Applicant: SYNZTEC CO., LTD., Tokyo (JP)

(72) Inventors: Shogo Suzuki, Kanagawa (JP); Atsushi Ikeda, Kanagawa (JP); Shuji Abe, Kanagawa (JP)

(73) Assignee: SYNZTEC CO., LTD., Tokyo (JP)

( * ) Notice: Subject to any disclaimer, the term of this patent is extended or adjusted under 35 U.S.C. 154(b) by 0 days.

(21) Appl. No.: 19/123,459

(22) PCT Filed: Nov. 21, 2023

(86) PCT No.: PCT/JP2023/041781
§ 371 (c)(1),
(2) Date: Apr. 23, 2025

(87) PCT Pub. No.: WO2024/116967
PCT Pub. Date: Jun. 6, 2024

(65) Prior Publication Data

US 2026/0050234 A1 Feb. 19, 2026

(30) Foreign Application Priority Data

Nov. 29, 2022 (JP) ................................ 2022-189827

(51) Int. Cl.
*G03G 21/00* (2006.01)

(52) U.S. Cl.
CPC ................................ *G03G 21/0017* (2013.01)

(58) Field of Classification Search
CPC ............. G03G 15/0812; G03G 15/161; G03G 21/0011; G03G 21/0017
(Continued)

(56) References Cited

U.S. PATENT DOCUMENTS 11,435,674 B2 9/2022 Okazaki et al.
2010/0036005 A1 2/2010 Sasagawa et al.
(Continued)

FOREIGN PATENT DOCUMENTS

CN 105573087 A * 5/2016 ......... G03G 21/0017
JP 2010-39392 2/2010
(Continued)

OTHER PUBLICATIONS

Extended European search report issued in EP Application No. 23897615.3, dated Mar. 10, 2026.
(Continued)

*Primary Examiner* — Hoan H Tran
(74) *Attorney, Agent, or Firm* — GREENBLUM & BERNSTEIN, P.L.C.

(57) ABSTRACT

A cleaning blade includes an elastic member having an edge that is brought into contact with a photoconductor member. The elastic member includes surface layers formed of a polyurethane rubber that contains an isocyanate silane and a rubber portion formed of a polyurethane rubber that does not contain an isocyanate silane. The surface layers include at least the edge. The value obtained by subtracting the elastic indentation modulus of the rubber portion from the elastic indentation modulus of a surface of the surface layers is −0.01 MPa or less.

14 Claims, 5 Drawing Sheets

(58) Field of Classification Search
USPC .......................................................... 399/350
See application file for complete search history.

(56) References Cited

U.S. PATENT DOCUMENTS

| | | | | |
|---|---|---|---|---|
| 2014/0064810 | A1* | 3/2014 | Iwamoto | G03G 21/0017 399/350 |
| 2016/0327899 | A1 | 11/2016 | Abe et al. | |
| 2018/0043398 | A1 | 2/2018 | Osajima et al. | |
| 2019/0011872 | A1 | 1/2019 | Kawabata et al. | |
| 2020/0026234 | A1 | 1/2020 | Hirota | |

FOREIGN PATENT DOCUMENTS

| | | | |
|---|---|---|---|
| JP | 2010-58297 | 3/2010 | |
| JP | 6094780 | 3/2017 | |
| JP | 6460358 | 1/2019 | |
| JP | 2020-12992 | 1/2020 | |
| WO | WO-2015093441 A1 * | 6/2015 | G03G 21/0017 |
| WO | 2016/208600 | 12/2016 | |

OTHER PUBLICATIONS

International Search Report issued in International Patent Application No. PCT/JP2023/041781, dated Jan. 30, 2024, along with an English translation thereof.

* cited by examiner

FIG. 5A

| SAMPLE NUMBER | RUBBER MATERIAL | TREATMENT LIQUID | | ELASTIC INDENTATION MODULI | | | DYNAMIC FRICTION COEFFICIENTS OF SURFACES | | | AMOUNT OF ABRASION |
|---|---|---|---|---|---|---|---|---|---|---|
| | HARDNESS | TYPE | RATIO OF LOW-ADHESION COMPONENTS IN LIQUID | ELASTIC INDENTATION MODULUS A OF SURFACES OF SURFACE TREATMENT LAYERS | ELASTIC INDENTATION MODULUS B OF SURFACES BEFORE FORMATION OF SURFACE TREATMENT LAYERS | A - B | DYNAMIC FRICTION COEFFICIENT C OF SURFACES OF SURFACE TREATMENT LAYERS | DYNAMIC FRICTION COEFFICIENT D OF SURFACES BEFORE FORMATION OF SURFACE TREATMENT LAYERS | C/D | |
| | [deg] | | [mass%] | [MPa] | [MPa] | [MPa] | [–] | [–] | [%] | [μm$^2$] |
| 1 | 76 | NONE | NONE | | 14.98 | | | 2.47 | | 37 |
| 2 | 76 | LIQUID 1 | 0.1% | 15.34 | 14.98 | 0.36 | 0.69 | 2.47 | 28% | 30 |
| 3 | 76 | LIQUID 1 | 0.4% | 17.10 | 14.98 | 2.12 | 0.17 | 2.47 | 7% | 28 |
| 4 | 76 | LIQUID 2 | 0.01% | 14.98 | 14.98 | 0.00 | 2.47 | 2.47 | 100% | 37 |
| 5 | 76 | LIQUID 2 | 0.02% | 14.97 | 14.98 | −0.01 | 0.39 | 2.47 | 16% | 23 |
| 6 | 76 | LIQUID 2 | 0.3% | 14.88 | 14.98 | −0.10 | 0.30 | 2.47 | 12% | 22 |
| 7 | 76 | LIQUID 2 | 0.6% | 14.78 | 14.98 | −0.20 | 0.21 | 2.47 | 9% | 23 |
| 8 | 76 | LIQUID 2 | 0.9% | 14.68 | 14.98 | −0.30 | 0.21 | 2.47 | 9% | 20 |
| 9 | 76 | LIQUID 2 | 4.0% | 13.59 | 14.98 | −1.39 | 0.17 | 2.47 | 7% | 20 |
| 10 | 88 | NONE | NONE | | 50.26 | | | 1.07 | | 30 |
| 11 | 88 | LIQUID 1 | 0.1% | 53.81 | 50.26 | 3.55 | 0.21 | 1.07 | 20% | 28 |

FIG. 5B

| SAMPLE NUMBER | RUBBER MATERIAL | TREATMENT LIQUID | | ELASTIC INDENTATION MODULI | | | DYNAMIC FRICTION COEFFICIENTS OF SURFACES | | | AMOUNT OF ABRASION |
|---|---|---|---|---|---|---|---|---|---|---|
| | HARDNESS | TYPE | RATIO OF LOW-ADHESION COMPONENTS IN LIQUID | ELASTIC INDENTATION MODULUS A OF SURFACES OF SURFACE TREATMENT LAYERS | ELASTIC INDENTATION MODULUS B OF SURFACES BEFORE FORMATION OF SURFACE TREATMENT LAYERS | A - B | DYNAMIC FRICTION COEFFICIENT C OF SURFACES OF SURFACE TREATMENT LAYERS | DYNAMIC FRICTION COEFFICIENT D OF SURFACES BEFORE FORMATION OF SURFACE TREATMENT LAYERS | C/D | |
| | [deg] | | [mass%] | [MPa] | [MPa] | [MPa] | [–] | [–] | [%] | [$\mu m^2$] |
| 12 | 88 | NONE | NONE | 50.23 | 50.26 | −0.03 | 0.80 | 1.07 | 74% | 27 |
| 13 | 88 | LIQUID 1 | 0.1% | 50.20 | 50.26 | −0.06 | 0.21 | 1.07 | 20% | 22 |
| 14 | 88 | LIQUID 2 | 0.2% | 50.14 | 50.26 | −0.12 | 0.13 | 1.07 | 12% | 21 |
| 15 | 88 | LIQUID 2 | 0.4% | 50.01 | 50.26 | −0.25 | 0.12 | 1.07 | 11% | 21 |
| 16 | 88 | LIQUID 2 | 0.8% | 49.77 | 50.26 | −0.49 | 0.10 | 1.07 | 9% | 20 |
| 17 | 88 | LIQUID 2 | 1.6% | 49.27 | 50.26 | −0.99 | 0.09 | 1.07 | 8% | 20 |
| 18 | 88 | LIQUID 2 | 4.0% | 47.79 | 50.26 | −2.47 | 0.08 | 1.07 | 7% | 19 |
| 19 | 88 | LIQUID 2 | 8.6% | 44.95 | 50.26 | −5.31 | 0.19 | 1.07 | 18% | 19 |
| 20 | 63 | NONE | NONE | | 6.09 | | | 2.73 | | 40 |
| 21 | 63 | LIQUID 2 | 0.2% | 5.80 | 6.09 | −0.29 | 0.56 | 2.73 | 21% | 24 |
| 22 | 63 | LIQUID 2 | 0.4% | 5.83 | 6.09 | −0.26 | 0.41 | 2.73 | 15% | 24 |

CLEANING BLADE AND METHOD OF PRODUCING ELASTIC MEMBER OF CLEANING BLADE

TECHNICAL FIELD

The present invention relates to cleaning blades used in electrophotographic image-forming apparatuses and methods of producing elastic members of cleaning blades.

BACKGROUND ART

In an electrophotographic image-forming apparatus (e.g., a copier or a printer), a toner image formed on the surface of a photoconductor member is transferred to a moving sheet. A cleaning blade removes the toner remaining on the surface of the photoconductor member.

It is desirable that cleaning blades have appropriate elasticity to cause moderate deformation thereof and have appropriate abrasion resistance to ensure long service life. Generally, from the viewpoint of elasticity and abrasion resistance, at least the tips of cleaning blades that contact the surface of the photoconductor member are made from thermosetting polyurethane rubbers (polyurethane elastomers).

Each of Patent Documents 1 and 2 discloses formation of a surface treatment layer having a low friction coefficient and a high elastic modulus, i.e., a high hardness on the elastic member of a cleaning blade.

BACKGROUND DOCUMENT(S)

Patent Document(s)

Patent Document 1: JP 6094780 B
Patent Document 2: JP 6460358 B

SUMMARY OF THE INVENTION

In image-forming apparatuses, the photoconductor member and surrounding elements are often provided as a single unit. In this case, the service life of the unit is determined by the element with the shortest service life. The cleaning blade is an element with a short service life, and there is a desire to further extend its service life.

The present invention provides a cleaning blade with a high abrasion resistance and a longer service life, and a method of producing an elastic member of a cleaning blade.

According to an aspect of the present invention, there is provided a cleaning blade. The cleaning blade includes an elastic member having an edge that is brought into contact with a photoconductor member. The elastic member includes surface layers formed of a polyurethane rubber that contains an isocyanate silane, and a rubber portion formed of a polyurethane rubber that does not contain an isocyanate silane. The surface layers include at least the edge. A value obtained by subtracting an elastic indentation modulus of the rubber portion from an elastic indentation modulus of a surface of the surface layers is −0.01 MPa or less.

According to another aspect of the present invention, there is provided a method of producing an elastic member of a cleaning blade. The method of producing the elastic member of the cleaning blade includes forming surface treatment layers containing an isocyanate silane on a material made from a polyurethane rubber. The forming of the surface treatment layers includes impregnating at least a region of the material that includes a part corresponding to an edge that is brought into contact with a photoconductor member with a treatment liquid containing an isocyanate silane; and drying the treatment liquid, whereby the surface treatment layers are formed such that a value obtained by subtracting an elastic indentation modulus of a surface of the material before formation of the surface treatment layers from an elastic indentation modulus of a surface of the surface treatment layers is −0.01 MPa or less.

In the aspects of the present invention, the abrasion resistance of the tip of the elastic member of the cleaning blade can be improved, and the service life of the elastic member of the cleaning blade can be extended.

BRIEF DESCRIPTION OF THE DRAWINGS

FIG. 5A is a table showing characteristics and test results of samples produced to research a suitable range according to the present invention.

FIG. 5B is a table showing characteristics and test results of samples produced to research the suitable range according to the present invention.

DESCRIPTION OF EMBODIMENT

Hereinafter, with reference to the accompanying drawings, various embodiments according to the present invention will be described. It is of note that the drawings are not necessarily to scale, and certain features may be depicted in exaggerated form or may be omitted.

Figure 1:
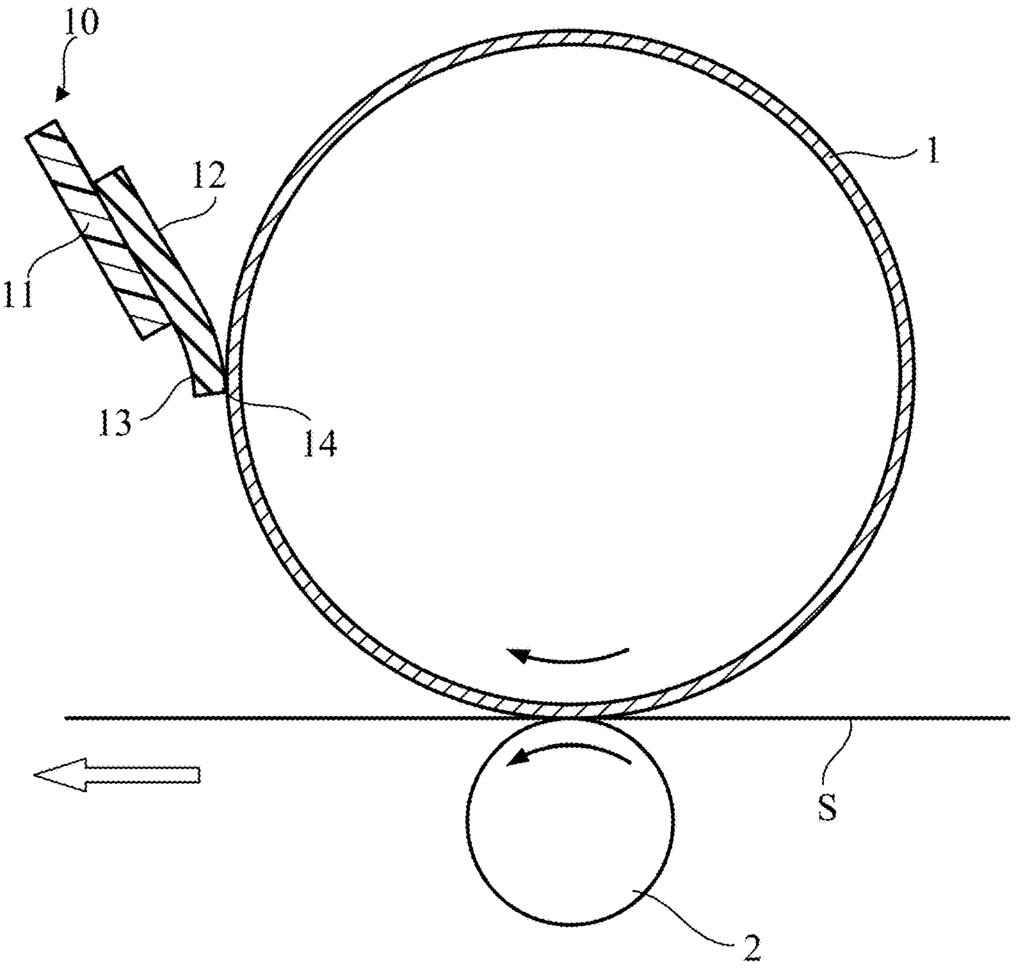
FIG. 1 is a diagram showing a cleaning blade in use according to an embodiment of the present invention.

As shown in FIG. 1, a cleaning blade 10 according to the embodiment is arranged in the vicinity of a photoconductor drum (photoconductor member) 1 of an electrophotographic image-forming apparatus. As is well known, a transferring device 2 is arranged in the vicinity of the photoconductor drum 1. While a sheet S of paper, which is transported by a transport device (not shown), passes through the nip between the photoconductor drum 1 and the transferring device 2, a toner image formed on the photoconductor drum 1 is transferred to the sheet S.

The toner that remains on the surface of the photoconductor drum 1 and is not transferred to the sheet S is removed by the cleaning blade 10. The image-forming apparatus has many other elements as well known to those skilled in the art, but the description of the other elements is omitted.

The cleaning blade 10 has a bracket (support member) 11 made from a hard plastic or a metal and an elastic member 12 fixed to the bracket 11. Both the bracket 11 and the elastic member 12 extend parallel to the axial direction of the photoconductor drum 1. The bracket 11 is fixed in place in the image-forming apparatus and supports the elastic member 12. While the bracket 11 has a high rigidity, the elastic member 12 has a moderate elasticity. The edge 14 of the tip 13 of the elastic member 12 is brought into contact with the outer peripheral surface of the photoconductor drum 1. The edge 14 of the tip 13, which is brought into contact with the photoconductor drum 1, scrapes off residual toner on the photoconductor drum 1. The elastic member 12, in particular the tip 13, is elastically deformed by the reaction force from the photoconductor drum 1.

It is desirable to improve the abrasion of the tip 13 of the cleaning blade 10 and to extend the service life of the cleaning blade 10. The tip 13 abrades due to friction with the photoconductor drum 1. It is considered that the abrasion of the tip 13 occurs due to the repeated stretching of the edge 14 of the tip 13 and cutting of the stretched portion. In order to reduce the abrasion resistance of the tip 13, it is desirable that at least the tip 13 of the cleaning blade 10, in particular the edge 14, have a suitable mechanical strength and a low friction coefficient.

Figure 2:
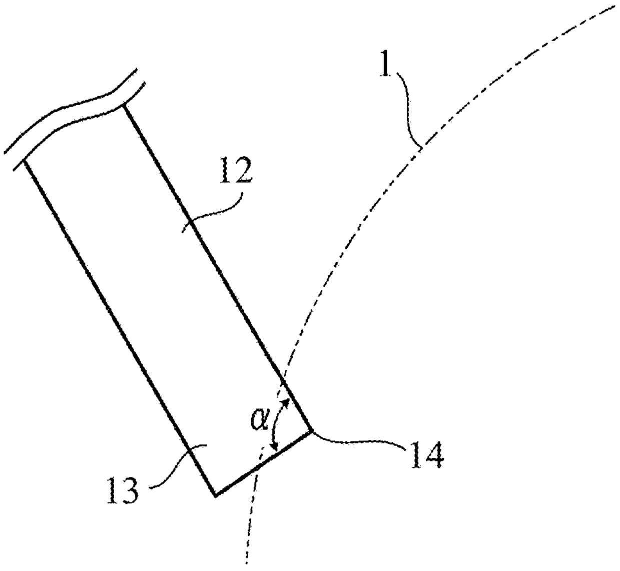
FIG. 2 is an enlarged view of an elastic member of the cleaning blade when not in use.

FIG. 2 is an enlarged view of the cleaning blade when not in use, and shows the angle α of the edge 14 of the tip 13. The angle α is usually 90 to 105 degrees. In FIG. 2, the photoconductor drum 1 is shown by a phantom line.

Figure 3:
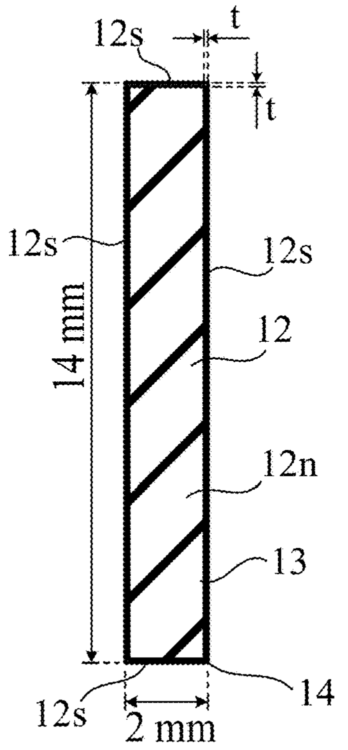
FIG. 3 is a cross-sectional view of the elastic member in an example of the embodiment of the present invention.
Figure 4:
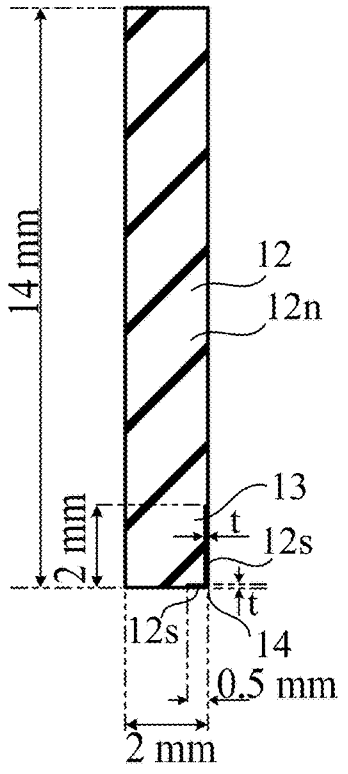
FIG. 4 is a cross-sectional view of the elastic member in another example of the embodiment of the present invention.

FIGS. 3 and 4 show cross-sectional views of examples of the elastic member 12 according to the embodiment of the present invention. The elastic member 12 according to the embodiment is formed of thermosetting polyurethane rubber. More precisely, the elastic member 12 has surface treatment layers (surface layers) 12*s* formed of a thermosetting polyurethane rubber that contains an isocyanate silane and a non-treated portion (rubber portion) 12*n* formed of a thermosetting polyurethane rubber that does not contain an isocyanate silane. The surface treatment layers 12*s* are formed by impregnating the thermosetting polyurethane rubber material with a treatment liquid containing the isocyanate silane and then drying the treatment liquid. The non-treated portion 12*n* is a portion that has not been impregnated with the treatment liquid and remains as the thermosetting polyurethane rubber material.

A main purpose of forming the surface treatment layers 12*s* is to reduce the coefficient of friction of the elastic member 12, in particular at the edge 14 and in the vicinity of the edge.

The dimensions of the elastic member 12 are shown in FIGS. 3 and 4. The elastic member 12 is a rectangular plate, and has, for example, a thickness of 2 mm and a length of 14 mm. Although not shown, the elastic member 12 has a width (the length perpendicular to the paper in FIGS. 3 and 4) of, for example, 350 mm. However, the dimensions of the elastic member 12 are merely examples for reference purposes and are not intended to limit the present invention. As shown in FIGS. 3 and 4, the thickness t of the surface treatment layers 12*s* is, for example, 10 micrometers to 200 micrometers and is less than the thickness of the elastic member 12.

In the example shown in FIG. 3, the surface treatment layers 12*s* are formed on all surfaces of the elastic member 12. This is because the surface treatment layers 12*s* are formed by impregnating all surfaces of the elastic member 12 with the treatment liquid (for example, by immersing the elastic member 12 in the treatment liquid). The thickness t of the surface treatment layers 12*s* is 10 micrometers to 200 micrometers, and is less than the thickness of the elastic member 12.

In the example shown in FIG. 4, the surface treatment layers 12*s* are formed on the edge 14 of the tip 13 of the elastic member 12 and in the vicinity of the edge 14. This is because the surface treatment layers 12*s* are formed by impregnating a region of the elastic member 12 that includes a part corresponding to edge 14 with the treatment liquid.

Accordingly, in the present invention, the surface treatment layers 12*s* do not need to be formed on all surfaces of the elastic member 12, and are formed in at least in a region including the edge 14. In the example in FIG. 4, the region in which the surface treatment layers 12*s* are formed has a range of 2 mm in the length direction of the elastic member 12 from the edge 14, and a range of 0.5 mm in the thickness direction of the elastic member 12 from the edge 14, but the dimensions of the region are only examples and are not intended to limit the present invention.

In the example shown in FIG. 4, the non-treated portion 12*n* is exposed on surfaces of the elastic member 12. By recording the region impregnated with the treatment liquid, the non-treated portion 12*n* can be distinguished from the surface treatment layers 12*s*. Accordingly, in the example shown in FIG. 4, it is easy to measure the elastic indentation modulus, which will be described later, of surfaces of the non-treated portion 12*n*, and it is easy to measure the dynamic friction coefficient of surfaces of the non-treated portion 12*n*. The elastic indentation modulus of surfaces of the non-treated portion (rubber portion) 12*n* is equal to the elastic indentation modulus of surfaces of the elastic member 12 before the surface treatment of the surface treatment layers (surface layers) 12*s*. The dynamic friction coefficient of surfaces of the non-treated portion 12*n* is equal to the dynamic friction coefficient of surfaces of the material of the elastic member 12 before the surface treatment of the surface treatment layers 12*s*.

In the example shown in FIG. 3, the non-treated portion 12*n* is not exposed on any surface of the elastic member 12. However, by cutting the elastic member 12 and measuring the hardness of multiple local areas of the elastic member 12, the non-treated portion 12*n* can be distinguished from the surface treatment layers 12*s*. This is because the modulus of elasticity (in other words, hardness) of the surface treatment layers 12*s* containing the isocyanate silane differs from the modulus of elasticity of the non-treated portion 12*n*, which does not contain an isocyanate silane. Accordingly, even in the example shown in FIG. 3, it is easy to measure the elastic indentation modulus, which will be described later, of surfaces of the non-treated portion 12*n*. In addition, if the surface roughness of the non-treated portion 12*n* obtained by cutting the elastic member 12 is the same as the surface roughness of the surface treatment layers 12*s* (or if the surface of the non-treated portion 12*n* is processed so that the surface roughness of the non-treated portion 12*n* is the same as that of the surface treatment layers 12*s*), it is possible to measure the dynamic friction coefficient of surfaces of the non-treated portion 12*n* under the same conditions as the surfaces of the surface treatment layers 12*s*.

The applicant prepared multiple samples of the elastic member 12, measured characteristics of the samples, and conducted abrasion tests.

The samples were manufactured by the following procedure.

First, three types of thermosetting polyurethane rubber, which are the materials of the elastic member 12, were prepared.

As shown in FIGS. 5A and 5B, the hardness of the three types of polyurethane rubber was 76, 88, and 63, respectively. The hardness of the rubber was measured using a Durometer Type A manufactured by Teclock Corporation (Nagano, Japan) in accordance with JIS K 6301, with a load of 9.8 N applied to each test piece in an environment with an air temperature of 23 degrees Celsius and a relative humidity of 55%. The thickness of each test piece was 12 mm.

The polyurethane rubber with a hardness of 76 was manufactured from a mixture containing "POLYLITE CT-4117" (trade name) manufactured by DIC Corporation (Tokyo, Japan) as a polyol, 4,4'-diphenylmethane diisocyanate (MDI) as an isocyanate, and trimethylolethane (TME) as a cross-linking agent. The molecular weight of "POLYLITE CT-4117" is 2000.

The polyurethane rubber with a hardness of 88 was produced from a mixture containing "POLYLITE CT-4117" as a polyol, 4,4'-diphenylmethane diisocyanate (MDI) as an isocyanate, and triethyl propane as a cross-linking agent.

The polyurethane rubber with a hardness of 63 was manufactured from a mixture containing "Kuraray Polyol O-2010" (trade name) manufactured by Kuraray Co., Ltd. (Tokyo, Japan) as a polyol, 4,4'-diphenylmethane diisocyanate (MDI) as an isocyanate, and triethyl propane as a cross-linking agent. The molecular weight of "Kuraray Polyol O-2010" is 2000.

Elastic members 12 corresponding to the samples shown in FIGS. 5A and 5B were cut out of the rubbers.

Next, the surface treatment layers 12*s* were formed by impregnating surfaces of the elastic members 12 with the treatment liquid and then drying the treatment liquid. Specifically, the treatment liquid was dip-coated onto surfaces of the elastic members 12. In the obtained samples, as shown in FIG. 3, the surface treatment layers 12*s* were formed on all surfaces of the elastic members 12. However, the scheme for impregnating surfaces of the elastic members 12 with the treatment liquid may also be spray-coating the treatment liquid onto surfaces of the elastic members 12. In addition, as shown in FIG. 4, the surface treatment layers 12*s* may be formed only on the edges 14 of the tips 13 of the elastic member 12 and the vicinities of the edges 14.

As shown in FIGS. 5A and 5B, two types of treatment liquid were used to form the surface treatment layers 12*s*. However, for comparison purposes, the surface treatment layers 12*s* were not formed on some samples (samples 1, 10, and 20).

Treatment liquid 1 contains "Modiper FS700" (trade name) manufactured by NOF Corporation (Tokyo, Japan). "Modiper FS700" contains acrylic silicone polymer and is a low-viscosity substance (low-adhesion component). Treatment liquid 1 contains 8.6 mass parts of diphenylmethane diisocyanate (MDI) manufactured by Nippon Polyurethane Industry Co., Ltd. (Tokyo, Japan), 2.6 mass parts of trimethylolpropane (TMP) manufactured by Nippon Polyurethane Industry Co., Ltd., "Modiper FS700", and methyl ethyl ketone (MEK). The molecular weight of MDI is 250.25, and the molecular weight of TMP is 134.17.

FIGS. 5A and 5B show the ratio of low-adhesion components in treatment liquid 1. For samples 2 and 11, treatment liquid 1 contained 0.1 mass parts of "Modiper FS700" and 88.7 mass parts of MEK, and the ratio of "Modiper FS700" to the entire treatment liquid 1 was 0.1 mass %. For Sample 3, treatment liquid 1 contained 0.4 mass parts of "Modiper FS700" and 88.4 mass parts of MEK, and the ratio of "Modiper FS700" to the entire treatment liquid 1 was 0.4 mass %.

Treatment liquid 2 is an embodiment according to the present invention. Treatment liquid 2 was obtained by dissolving "Orgatics SIC-330" (trade name) manufactured by Matsumoto Fine Chemical Co., Ltd. (Chiba, Japan) in ethyl acetate, which is a solvent. "Orgatics SIC-330" contains an isocyanate silane and is a low-viscosity substance (low-adhesion component). Specifically, it contains 5-15% by weight of monomethyl tri-isocyanate silane ($CH_3Si(NCO)_3$).

FIGS. 5A and 5B show the ratio of the low-adhesion components in treatment liquid 2. For example, for sample 6, treatment liquid 2 contained 0.3 mass parts of "Orgatics SIC-330" and 99.7 mass parts of ethyl acetate, and the ratio of the "Orgatics SIC-330" to the entire treatment liquid 2 was 0.3 mass %.

By immersing the elastic member 12 in treatment liquid 1 or treatment liquid 2 maintained at 23 degrees Celsius for 60 seconds, the surfaces of the elastic member 12 are impregnated with treatment liquid 1 or treatment liquid 2. Then, by leaving the elastic member 12 in the internal space of an oven maintained at 50 degrees Celsius for one hour, the elastic member 12 was heated and the surface treatment layers 12*s* were cured. However, the scheme of curing the surface treatment layers 12*s* may be either air-draft drying or natural drying.

Then, the elastic member 12 with the cured surface treatment layers 12*s* was bonded to the bracket 11, so that each sample of the cleaning blade 10 was completed. On the other hand, an elastic member 12 that does not have a surface treatment layer 12*s* was bonded to the bracket 11 to complete each of samples 1, 10, and 20 of the cleaning blade 10.

The elastic indentation moduli (also called indentation elastic moduli or indentation moduli) of surfaces of the samples were measured before and after the formation of the surface treatment layers 12*s*. On the other hand, the elastic indentation moduli of surfaces of samples 1, 10, and 20 without a surface treatment layer 12*s* were also measured. The elastic indentation modulus was measured using "Dynamic Ultra Micro Hardness Tester (DUH-211R)" (trade name) manufactured by Shimadzu Corporation (Kyoto, Japan) in accordance with ISO 14577, under a load-unload test in an environment with an air temperature of 23 degrees Celsius and a relative humidity of 55%. The indenter used was a triangular pyramid indenter with a vertex angle of 115 degrees, and the apex was pressed into the sample. Specifically, the indenter was pressed into the sample at a loading speed of 0.14 mN/s until the load applied by the indenter reached a maximum load of 0.98 mN, and then the indenter was maintained at the maximum load for 5 seconds. Then, the load was reduced at a loading speed of −0.14 mN/s. The depth of indentation of the indenter into the sample at the maximum load was from 3 micrometers to 10 micrometers, which was equal to or less than the thickness t of the surface treatment layers 12*s*.

The elastic indentation moduli A and B of surfaces of the samples before and after the formation of the surface treatment layers 12*s*, and the difference between the values A−B are shown in FIGS. 5A and 5B. The elastic indentation moduli B of surfaces of samples 1, 10, and 20, which do not have a surface treatment layer 12*s*, are also shown in FIGS. 5A and 5B. As is clear from FIGS. 5A and 5B, the formation of the surface treatment layers 12*s* caused a significant increase in the elastic indentation modulus (i.e., hardness) of samples 2, 3, and 11. On the other hand, the formation of the surface treatment layers 12*s* caused a decrease in the elastic indentation modulus (i.e., hardness) of samples 5 to 9, 12 to 19, 21, and 22. For sample 4, the elastic indentation modulus (i.e., hardness) did not change.

In addition, the dynamic friction coefficients of surfaces of the samples were measured before and after the formation of the surface treatment layers 12*s*. On the other hand, the dynamic friction coefficients of surfaces of samples 1, 10, and 20, which do not have a surface treatment layer 12*s*, were also measured. The dynamic friction coefficient was measured in an environment with an air temperature of 23 degrees Celsius and a relative humidity of 55%, in accordance with JIS K 7125 (ISO 8295), using "HEIDON Friction Wear Tester Tribo Gear" (trade name) manufactured by Shinto Scientific Co., Ltd. In the measurement, a ball indenter made from stainless steel SUS304 with a diameter of 10 mm was used as the sliding piece, and the load applied to the samples by the ball indenter was 0.98 N. The ball indenter was moved back and forth over a distance of 50 mm at a speed of 50 mm/min to measure the dynamic friction coefficient.

The dynamic friction coefficients C and D of surfaces of the samples before and after the formation of the surface treatment layers 12*s*, and the ratio C/D, are shown in FIGS. 5A and 5B. The dynamic friction coefficients D of surfaces of samples 1, 10, and 20, which do not have a surface treatment layer 12*s*, are also shown in FIGS. 5A and 5B. As can be seen in FIGS. 5A and 5B, except for samples 1, 10, and 20, in which the surface treatment layers 12*s* were not formed, and sample 4, for which the difference A−B is zero, the formation of the surface treatment layers 12*s* was able to significantly reduce the dynamic friction coefficient in the other samples. In other words, the dynamic friction coefficient of surfaces of the surface treatment layers 12*s* is significantly lower than that of surfaces of the non-treated portion 12*n*, assuming that the surfaces have the same surface roughness.

The amount of abrasion on the tip 13 of the elastic member 12 was measured for each sample in the following experiments shown in FIGS. 6 and 7. The amount of abrasion was measured in an environment with an air temperature of 23 degrees Celsius and a relative humidity of 55%. The length of the samples of the elastic member 12 was 14 mm, the length of the samples protruding from the end of the bracket 11 was 9 mm, and the thickness T of the samples was 2 mm. The width of the samples (the length perpendicular to the paper in FIG. 6) was 50 mm. The angle α of the edge 14 (see FIG. 2) was 90 degrees. The length L was measured when the elastic member 12 was in a straight state.

Figure 6:
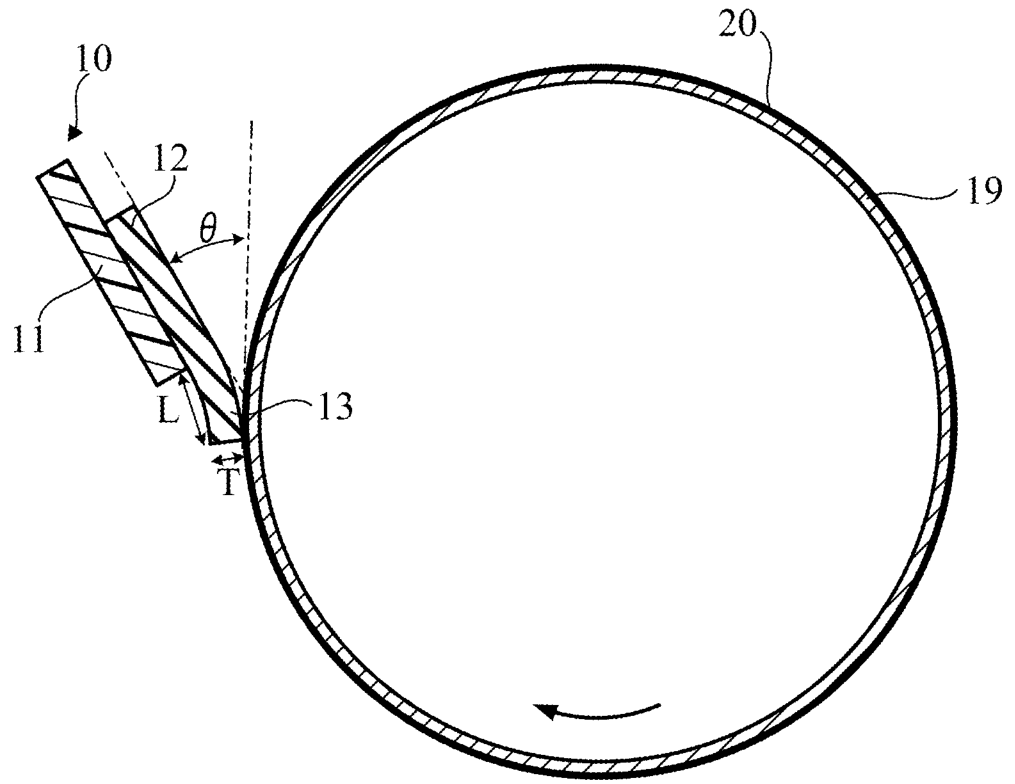
FIG. 6 is a diagram showing a state of an abrasion test of the cleaning blade to research the suitable range according to the present invention.
Figure 7:
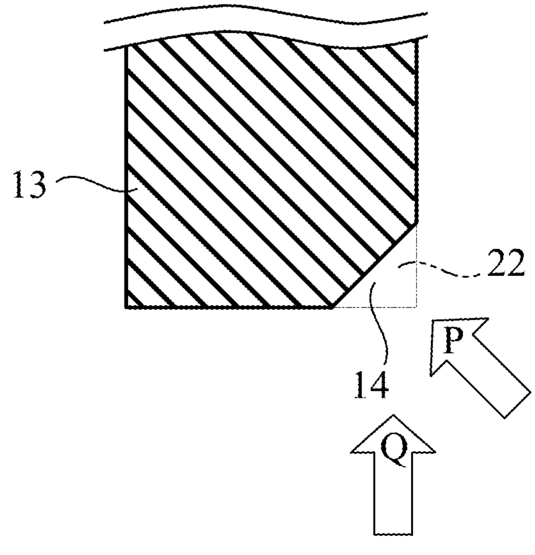
FIG. 7 is a diagram showing a state of abrasion measurement of the cleaning blade.

As shown in FIG. 6, a lapping film 20 with a thickness of 0.3 micrometers was wrapped around the outer peripheral surface of a rotatable cylinder 19. The cylinder 19 was made of a glass material with a polycarbonate coating on the surface thereof, and was used to mimic a photoconductor drum 1. The lapping film 20 was "Lapping Film Abrasive #15000 A3-0.3SHT" available from 3M Japan Limited (Tokyo Japan). The reason for wrapping the lapping film 20 around the cylinder 19 was to accelerate the abrasion of the tip 13 of the elastic member 12 by the abrasive substance.

Next, the elastic member 12 of the cleaning blade 10 was brought into contact with the cylinder 19 wrapped with the lapping film 20 at a contact angle θ and a contact load of 0.18 N/cm. The contact angle θ was 20 degrees. The cylinder 19 was then rotated at a peripheral speed of 460 mm/s together with the lapping film 20, and the lapping film 20 on the cylinder 19 was slid against the elastic member 12 over a distance of 1485 mm (the total length of five sheets of A4 size paper).

Then, the amount of abrasion on the tip 13 of the elastic member 12 was measured. To measure the amount of abrasion, a laser microscope, "VK-X250" (trade name) made by Keyence Corporation (Osaka, Japan) was used, with an objective lens having a magnification of 150 times, to photograph the edge 14 of the tip 13, and the area of the worn part 22 was calculated in the photographed image. The direction of photograph was slanted with respect to the longitudinal direction of the elastic member 12 (the arrow P in FIG. 7 indicates the direction of the photograph), but by mathematical correction, it was possible to calculate the area of the worn part 22 (the area orthogonal to the longitudinal direction of the elastic member 12) seen along the longitudinal direction of the elastic member 12 (the direction of the arrow Q in FIG. 7). The photographing was performed to capture three positions along the longitudinal direction of the elastic member. The average of the areas obtained calculated for the three positions is shown in FIGS. 5A and 5B.

From the results of the abrasion tests, the amounts of abrasion for samples 1, 10, and 20, which were not subjected to the surface treatment, were 30 $\mu m^2$ or more. In addition, for samples 2, 3, and 11, which were subjected to the surface treatment using treatment liquid 1 to form the surface treatment layers 12*s*, the amounts of abrasion were 28 $\mu m^2$ or more, which were greater than those for samples 5 to 9, 12 to 19, 21, and 22. For samples 2, 3, and 11, the elastic indentation moduli of surfaces increased (i.e., the surface hardened) because of the surface treatment (formation of the surface treatment layers 12*s*).

Accordingly, it is desirable to form the surface treatment layers 12*s* using treatment liquid 2, which contains an isocyanate silane. In samples 5 to 9, 12 to 19, 21, and 22, in which the surface treatment layers 12*s* were formed using treatment liquid 2, which had low abrasion amounts, the elastic indentation moduli A of surfaces of the surface treatment layers 12*s* varied. In addition, in samples 4 and 5, in which the surface treatment layers 12*s* were formed using treatment liquid 2, the elastic indentation moduli A of surfaces of the surface treatment layers 12*s* were similar to each other, but the abrasion amounts differed markedly. Therefore, the elastic indentation modulus A of surfaces of the surface treatment layers 12*s* alone is not a reason for the reduction in abrasion amount.

Accordingly, let us focus on the difference between the elastic indentation modulus A of surfaces of the surface treatment layers 12*s* and the elastic indentation modulus B of the surfaces before the surface treatment. Considering samples 5 to 9, 12 to 19, 21, and 22, and also considering the difference in the amounts of abrasion of samples 4 and 5, it is preferable that the difference A−B be −0.01 MPa or less. This is contrary to the teachings of the prior art (patent documents 1 and 2), and means that it is preferable that the elastic indentation modulus of the surface decrease (i.e., the surface soften) due to the surface treatment.

In this respect, the applicant considers the following. It has been conventionally believed that when the modulus of elasticity (i.e., hardness) of the surfaces of edge 14 of the elastic member 12 is high, the abrasion of edge 14 will be small. However, in this case, the contact area between the photoconductor drum 1 and the elastic member 12 is small (see FIG. 1). In a case in which the contact area is small, the stress concentrated on the edge 14 is large, which will cause minute cracking and peeling off of the edge 14. However, if the modulus of elasticity (i.e., hardness) of the surfaces of the edge 14 of the elastic member 12 is low, the contact area between the photoconductor drum 1 and the elastic member 12 is large, so that the stress applied to the edge 14 is small, and the edge 14 is unlikely to crack and peel off.

The surface treatment layers 12*s* disposed at least on the edge 14 and its vicinity extend thinly around the non-treated portion 12*n*, which has a higher modulus of elasticity. If the difference between the elastic indentation modulus A of surfaces of the surface treatment layers 12*s* and the elastic indentation modulus B of the surfaces before surface treatment (the elastic indentation modulus of the non-treated portion 12*n*) is moderate, the stress applied to the edge 14 will be small, and the edge 14 will be less likely to crack and peel off. From the results of samples 5 to 9, 12 to 19, 21, and 22, and the difference in the amounts of abrasion of samples 4 and 5, it is preferable that the value obtained by subtracting the elastic indentation modulus B of the non-treated portion (rubber portion) 12*n* from the elastic indentation modulus A of surfaces of the surface treatment layers (surface layers) 12*s* be −0.01 MPa or less. In the process of forming the surface treatment layers 12*s*, it is preferable to form the surface treatment layers 12*s* so that the value obtained by subtracting the elastic indentation modulus of surfaces of the polyurethane rubber material before forming the surface treatment layers 12*s* from the elastic indentation modulus of surfaces of the surface treatment layers 12*s* is −0.01 MPa or less.

It is further preferable that the value obtained by subtracting the elastic indentation modulus B of the non-treated portion (rubber portion) 12*n* from the elastic indentation modulus A of surfaces of the surface treatment layers (surface layers) 12*s* be −0.30 MPa or less. In the process of forming the surface treatment layers 12*s*, it is further preferable to form the surface treatment layers so that the value obtained by subtracting the elastic indentation modulus of surfaces of the polyurethane rubber material before forming the surface treatment layers 12*s* from the elastic indentation modulus of surfaces of the surface treatment layers 12*s* is −0.30 MPa or less. In this case, as in samples 8, 9, 16 to 19, the amount of abrasion can be reduced to 20 $\mu m^2$ or less.

The tests were conducted only in cases in which the difference A−B was −5.31 MPa or more. However, it will also be possible to reduce the amount of abrasion even in cases in which the difference A−B is smaller.

In addition to the above condition of A−B≤−0.01 MPa, it is preferable that the ratio of the dynamic friction coefficient C of surfaces of the surface treatment layers (surface layers) 12*s* to the dynamic friction coefficient D of the non-treated portion (rubber portion) 12*n* be 74% or less, from the results of samples 5 to 9, 12 to 19, 21, and 22, and the difference in the amounts of abrasion of samples 4 and 5. In the process of forming the surface treatment layers 12*s*, it is preferable to form the surface treatment layers 12*s* so that the ratio of the dynamic friction coefficient C of surfaces of the surface treatment layers 12*s* to the dynamic friction coefficient D of surfaces of the polyurethane rubber material before forming the surface treatment layers 12*s* be 74% or less.

Furthermore, in addition to the above condition of A−B≤−0.01 MPa, in view of samples 5-9, 13-19, 21, and 22, it is further preferable that the ratio of the dynamic friction coefficient C of surfaces of the surface treatment layers (surface layers) 12*s* to the dynamic friction coefficient D of the non-treated portion (rubber portion) 12*n* be less than 21%. In the process of forming the surface treatment layers 12*s*, it is further preferable to form the surface treatment layers 12*s* so that the ratio of the dynamic friction coefficient C of surfaces of the surface treatment layers 12*s* to the dynamic friction coefficient D of surfaces of the polyurethane rubber material before forming the surface treatment layers 12*s* be less than 21%. In this case, the amount of abrasion can be reduced to less than 24 $\mu m^2$. The tests were conducted only in cases in which the ratio C/D was 7% or more. However, it will also be possible to reduce the amount of abrasion in cases in which the ratio C/D is smaller.

Alternatively, in addition to the above condition of the difference A−B≤−0.01 MPa, in view of samples 5 to 9 and 13 to 19, it is preferable that the dynamic friction coefficient C of surfaces of the surface treatment layers (surface layers) 12*s* be less than 0.41. In the process of forming the surface treatment layers 12*s*, it is preferable to form the surface treatment layers 12*s* so that the dynamic friction coefficient C of surfaces of the surface treatment layers 12*s* be less than 0.41. In this case, the amount of abrasion can be reduced to less than 24 $\mu m^2$. The tests were conducted only in cases in which the dynamic friction coefficient C was 0.08 or more. However, it will also be possible to reduce the amount of abrasion in cases in which the dynamic friction coefficient C is smaller.

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

For example, in the above embodiment, the cleaning blade is in contact with the outer peripheral surface of the photoconductor drum 1 to clean the photoconductor drum 1. However, the cleaning blade of the present invention may be in contact with a photoconductor belt wound around multiple rolls instead of the photoconductor drum 1 to clean the belt.

REFERENCE SYMBOLS

10: Cleaning blade
11: Bracket (support member)
12: Elastic member
12*s*: Surface treatment layer (surface layer)
12*n*: Non-treated portion (rubber portion)
13: Tip
14: Edge

The invention claimed is:

1. A cleaning blade comprising an elastic member having an edge that is brought into contact with a photoconductor member, the elastic member including:

surface layers formed of a polyurethane rubber that contains an isocyanate silane; and a rubber portion formed of a polyurethane rubber that does not contain an isocyanate silane, the surface layers including at least the edge, a value obtained by subtracting an elastic indentation modulus of the rubber portion from an elastic indentation modulus of a surface of the surface layers being −0.01 MPa or less.

2. The cleaning blade according to claim 1, wherein the value is −0.30 MPa or less.

3. The cleaning blade according to claim 1, wherein the value is −5.31 MPa or more.

4. The cleaning blade according to claim 1, wherein a ratio of a dynamic friction coefficient of the surface of the surface layers to a dynamic friction coefficient of the rubber portion is 74% or less.

5. The cleaning blade according to claim 4, wherein the ratio is less than 21%.

6. The cleaning blade according to claim 4, wherein the ratio is 7% or more.

7. The cleaning blade according to claim 1, wherein a dynamic friction coefficient of the surface of the surface layers is less than 0.41.

8. A method of producing an elastic member of a cleaning blade, the method comprising forming surface treatment layers containing an isocyanate silane on a material made from a polyurethane rubber, the forming of the surface treatment layers including:

impregnating at least a region of the material that includes a part corresponding to an edge that is brought into contact with a photoconductor member with a treatment liquid containing an isocyanate silane; and drying the treatment liquid, wherein the forming of the surface treatment layers results in that a value obtained by subtracting an elastic indentation modulus of a surface of the material before formation of the surface treatment layers from an elastic indentation modulus of a surface of the surface treatment layers is-0.01 MPa or less.

9. The method according to claim 8, wherein the forming of the surface treatment layers results in that the value is −0.30 MPa or less.

10. The method according to claim 8, wherein the forming of the surface treatment layers results in that the value is −5.31 MPa or more.

11. The production method according to claim 8, wherein the forming of the surface treatment layers results in that a ratio of a dynamic friction coefficient of the surface of the surface treatment layers to a dynamic friction coefficient of a surface of the material before forming the surface treatment layers is 74% or less.

12. The method according to claim 11, wherein the forming of the surface treatment layers results in is that the ratio is less than 21%.

13. The method according to claim 11, wherein the forming of the surface treatment layers results in that the ratio is 7% or more.

14. The production method according to claim 8, wherein the forming of the surface treatment layers results in that a dynamic friction coefficient of the surface of the surface treatment layers is less than 0.41.

* * * * *